United States Patent [19]

Eaton, Jr. et al.

[11] 3,800,691
[45] Apr. 2, 1974

[54] TOASTER-OVEN

[75] Inventors: John L. Eaton, Jr., Delanco; Kenneth L. Richard, Newtown Square; Walter M. Schwartz, Jr., Philadelphia, all of Pa.

[73] Assignee: Proctor-Silex Incorporated, Philadelphia, Pa.

[22] Filed: Apr. 6, 1972

[21] Appl. No.: 241,571

Related U.S. Application Data

[62] Division of Ser. No. 60,468, Aug. 3, 1970, Pat. No. 3,669,004.

[52] U.S. Cl. .................................. 99/391, 99/393
[51] Int. Cl. ............................................ A47j 37/08
[58] Field of Search ..................... 99/391, 331–332, 99/334–335, 337, 339–340, 341, 385–386, 389, 390, 392–393, 401, 427, 447; 219/336, 337, 354, 520, 521, 553

[56] References Cited
UNITED STATES PATENTS

| | | | |
|---|---|---|---|
| 2,465,577 | 3/1949 | Cox | 99/389 X |
| 2,680,183 | 6/1954 | Gomersall | 99/389 X |
| 3,169,469 | 2/1965 | Parr | 99/401 X |
| 3,347,153 | 10/1967 | Sutton | 99/391 X |
| 3,472,153 | 10/1969 | Arntz | 99/391 X |

*Primary Examiner*—Harvey C. Hornsby
*Assistant Examiner*—Arthur O. Henderson
*Attorney, Agent, or Firm*—Milton M. Wolson; E. F. Weinberger

[57] ABSTRACT

A toaster-oven comprising a plurality of readily releasable components including a chassis component, an end panel component and four heating element components. The chassis component comprises a common heating chamber which, having unique venting of the toasting thermostat, receives a vertically positioned, food supporting carriage movable therein in a toast mode from food receiving position to food toasting position and which receives a grill component in horizontal position movable therein in an oven mode from food receiving position to food cooking position. The heating element components are related to the reflecting surfaces of the common heating chamber so that, in conjunction with modulation of the power input to certain of the element components, effective cooking in both the toast and oven modes of operation is obtained. Thus, a readily serviceable and effective multipurpose appliance is disclosed.

11 Claims, 7 Drawing Figures

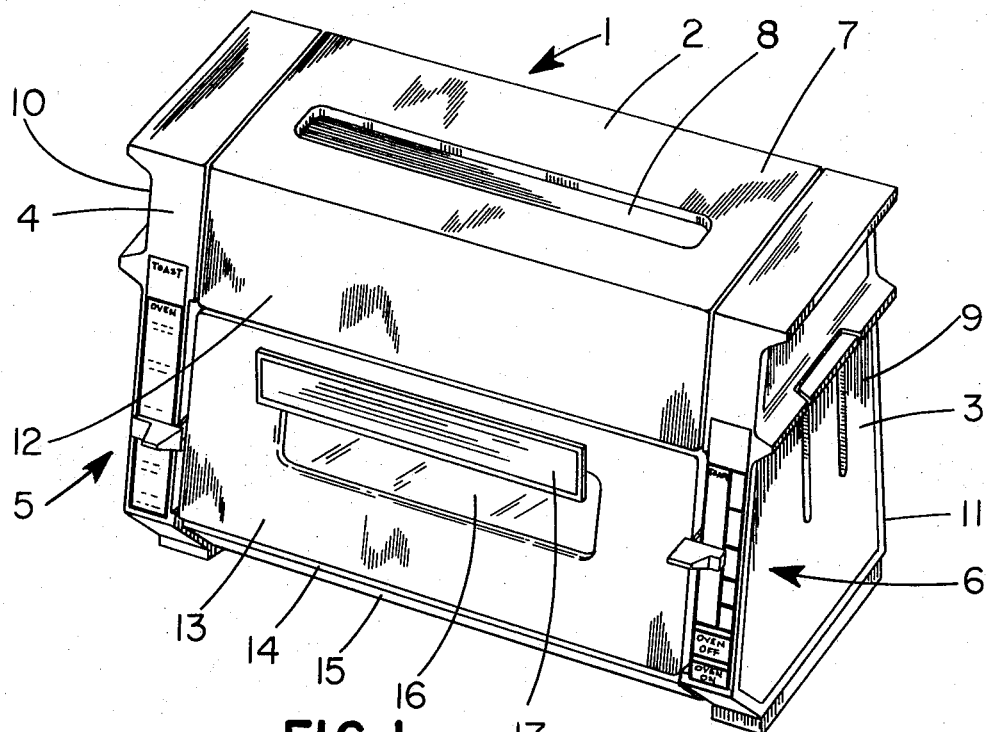
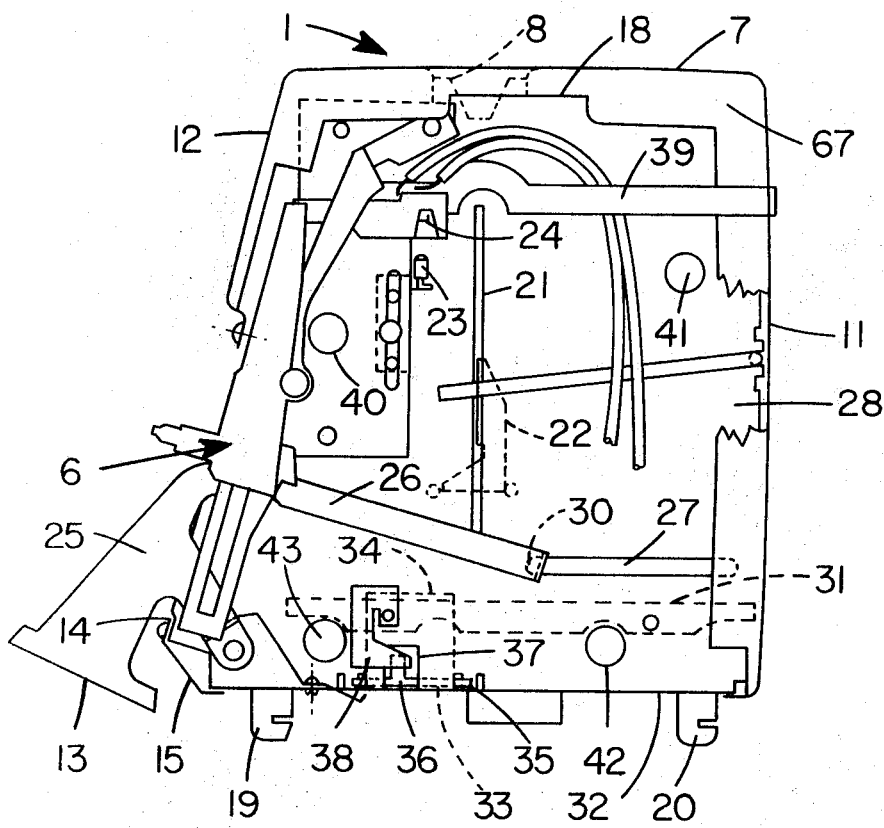

3,800,691

TOASTER-OVEN

RELATED APPLICATIONS

This application is a division of our application Ser. No. 60,468 filed Aug. 3, 1970 and which is now Pat. No. 3,669,004 issued on June 13, 1972.

BACKGROUND OF THE INVENTION

1. Field of the Invention

This invention relates to the field of heating appliances and, more particularly, to the field of combination food toasting and cooling appliances.

2. Description of the Prior Art

The toaster and oven arts are, individually, very crowded. Attempts have been made to relate the two arts because of the substantial, analogous structure involved, in each, unsuccessfully. Examples of such attempts are shown in U.S. Pat. Nos. 2,368,440, issued Jan. 30, 1945; 2,465,577, issued Mar. 29, 1949; 2,862,441, issued Dec. 2, 1958; and 2,912,922, issued Nov. 17, 1959. These patents all relate in broad analogy to the present invention in disclosing a vertical toast and horizontal oven combination applicance. However, none of the prior art patents has shown the readily releasable components of the present invention nor the interrelationship of toasting and cooking modes and the structure which gives rise thereto.

With respect to the ready release of components, U.S. Pat. No. 3,483,814, issued Dec. 16, 1969 to the same assignee as the present invention, is of interest. This patent discloses a plurality of components which may be interconnected in varying ways to arrive at a toast which may be readily assembled and disassembled for servicing and cleaning. Certain of the features of the toaster construction shown by the latter patent have been incorporated in the preferred embodiment to be described in detail hereinafter, and this patent will, therefore, be incorporated herein by reference when discussing those certain features. However, this patent does not anticipate a combination of vertical toasting and horizontal cooking modes nor the interrelationship of structure which facilitates such combination and renders it feasible.

SUMMARY OF THE INVENTION

This invention is directed toward an appliance which combines a vertical, toast mode and a horizontal, oven mode with both modes utilizing a common heating chamber and being defined by structure comprising a plurality of readily releasable components. In addition, an air flow pattern for the toasting thermostat is provided to permit effective, immediately succeeding toasting operations.

The objects, features, and advantages of the present invention will become more apparent when reading the following description in the light of the accompanying drawings and claims.

BRIEF DESCRIPTION OF THE DRAWINGS

FIG. 1 is a perspective view of a toaster-oven embodying the present invention;

FIG. 2 is a right end view of the chassis component broken away in part;

DESCRIPTION OF THE PREFERRED EMBODIMENT

Figure 3:
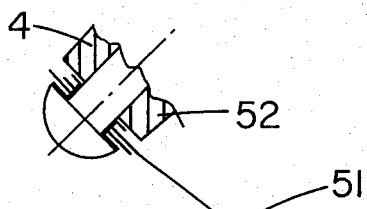
FIG. 3 is an elevation view, cross-sectioned in part, of one of the left end panel heating element sockets and its flexible support.
Figure 4:
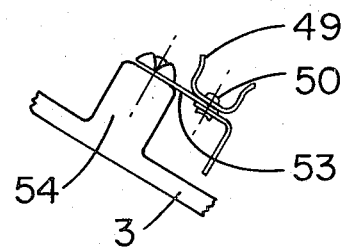
FIG. 4 is an elevation view of one of the right end panel heating element sockets and its rigid support.

The present invention incorporates herein by reference the disclosures of the following patents: U.S. Pat. No. 2,796,492, issued June 18, 1957 to J. J. Lawser for Adjustable Thermostatic Control Mechanism; U.S. Pat. No. 2,951,432, issued Sept. 6, 1960 to J. J. Lawser for Bread Toaster; U.S. Pat. No. 3,035,509, issued May 22, 1962 to J. J. Lawser for Bread Toaster; and U.S. Pat. No. 3,483,814, issued Dec. 16, 1969 to W. M. Schwartz, Jr., et al. for Bread Toaster.

Referring now more specifically to the drawing with reference numerals, in FIG. 1, a toaster-oven embodying the present invention is generally indicated at 1. The toaster-oven basically comprises a chassis component 2, preferably made of chrome plated cold rolled steel, a right end panel component 3 and a left end panel 4 with the panel 3 readily removable from the component 2 and the panel 4 substantially fixed to the component 2. Both end panels, preferably made of molded phenolic, together include the basic electrical circuitry of the toasteroven. Thus, the panel 4 includes the oven thermostat control generally designated at 5 and the right panel 3 includes the toast thermostat control and oven on and off switch generally designated at 6.

The toaster-oven 1 is generally trapezoidal in cross-sectional configuration and includes upper wall 7 having the vertical toasting slot 8, end walls 9 and 10, rear wall 11, and front wall portions 12, 13, 14 and 15. The front wall portion 13, as can be seen in FIG. 1, includes window 16, preferably made of a rigid, high temperature transparent material, and also acts as a door having handle 17 to permit access to the internal heating chamber defined in part by certain of the walls previously mentioned.

Referring now to FIG. 2, the periphery of the chassis component 2 includes rebent portion 67 on both ends for abutment of the end panels. In addition, the rebent portion 67 of the right end as shown in FIG. 2 includes a cutaway 18 which acts as one point of a three point latching system for the right end panel 3. The other two points are shown at 19 and 20 respectively. It should be noted, however, that this latching relationship of right end panel component 3 to chassis component 2 is not a part of the present invention and may be as more specifically shown in U.S. Pat. No. 3,483,814, previously incorporated herein by reference.

The chassis component includes a toasting function including the slot 8 in its upper wall, carriage actuator slot 21 and carriage support 22 for conventional vertical food carriage means, not shown. Again, the interrelationship of the right end panel component 3 with the chassis component 2 with respect to movement of support 22 is shown more specifically in U.S. Pat. No. 3,483,814. As is conventional in toasters, the chassis component 2 includes a thermostat assembly with pusher 23 which, upon temperature responsive, biasing contact with contact 24 moving it to a closed circuit position, actuates an electromagnetic carriage release mechanism as more specifically described in U.S. Pat. No. 2,951,432, previously incorporated herein by reference.

Front wall portion 13 which acts as a door is mechanically connected to the chassis component 2 by linkages at both ends including linkages 25 which are pivotally connected to linkages 26. Linkages 26 have end pins 30 integral therewith and slidably movable in slots 27 formed in the end walls 28 of the chassis component, and the pins 30 are intended to project into the interior of the chassis component to releasably relate to a horizontal food carriage means or grill component, not shown, to move the grill component inwardly and outwardly in relation to the position of the wall or door 13. The grill component is intended to be supported in its sliding movement by coplanar shelves 31 secured to the inner side of each of the end walls 28.

Figure 5:
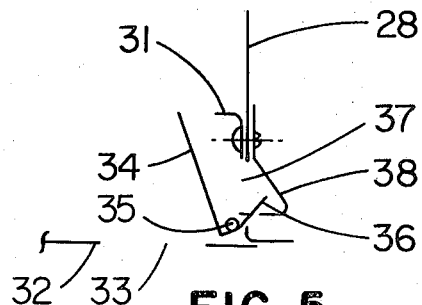
FIG. 5 is a schematic elevation view of the venting door and its actuator.

The bottom wall 32 of the chassis component has an opening 33 therein substantially directly below the toasting thermostat assembly, not shown, within the chassis component interior to permit cool air flow to the thermostat assembly. Thus, subsequent to each toasting function, the bias on contact 24 caused by the temperature response of the toasting thermostat on pusher 23 may be broken to return the pusher and contact 24 to a functional gap. The opening 33 is closed during the toasting and oven modes of operation by a vent door 34, preferably made of metal which is hinged to the end wall 28 by hinge pin 35 and has a projecting tab 36 which extends through an opening 37 in end wall 28 and passes through a slot in actuator 38. Thus, as seen in FIG. 5, the actuator 38, preferably made of spring metal, is baised outwardly and downwardly from the wall 28 and, upon downward vertical movement of the carriage support 22 into toasting position or control 6 to oven "on" position moves inwardly to rotate the trap door 34 to close the opening 33.

Although not forming a part of the present invention, the thermostat assembly for the toasting operation may include a calibrating adjustment 39, and shielding arrangement, not shown, which is more specifically disclosed in U.S. Pat. No. 3,035,509 previously incorporated herein by reference.

Figure 7:
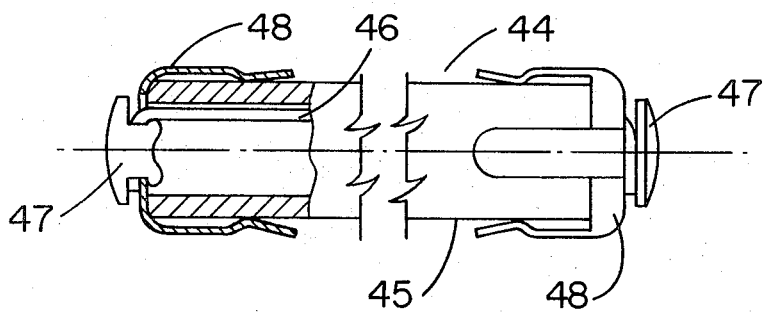
FIG. 7 is an elevation view, broken away and cross-sectioned in part, of a heating element component of the present invention.

Each of the walls 28 of the chassis component includes four openings 40, 41, 42 and 43, shown in FIG. 2, opposed pairs of which are aligned to receive and support heating element components preferably of 400 watt rating each as generally shown in FIG. 7 at 44. Each heating element component comprises a cylindrical glass tube 45, preferably made of Vycor, a trademark of Corning Glass Works, and an element wire 46, preferably of the type known as Kanthal "D", a trademark of the Kanthal Corporation, which is received within the tube 45 and is secured to contact rivets 47 at both ends of the tube. The rivets 47 are retained in place by caps 48 which have axially extending, inwardly spring biased fingers with flared ends to provide ease of assembly and secure contact between the caps and tube.

Each end panel 3, 4 has in alignment with a respective opening 40–43 socket means 49 for receiving and supporting the ends of the element components 44 in opposition. Thus, as seen in FIG. 3, the left end panel 4 has socket means 40, each with a contact rivet 50 securing it to a flexible, electrically conductive support 51 fixedly held to an anchor 52 integral with the panel 4. Each of the socket means 49 aligned with the openings 40–43 in the left end wall 28 of the chassis component 2 is intended to be flexibly supported as at 51 for spring loading of the heating element components 44, as described more particularly hereinafter.

The right end panel component 3 includes four socket means 49 of the same construction as the socket means within the left end panel 4 but which are secured by a rigid, electrically conductive support 53 to the anchor 54 of the panel 3. Each of the rigidly supported socket means 49 with its contact rivet 50 supports and receives one of the ends of respective heating element components and, with the flexibility of support 51 in the end panel 4, permits constant, biased contact of the respective pairs of adjacent contact rivets 47 and 50.

Thus, for replacement of any of the heating element components which may be defective, the user needs merely to unlatch the right end panel component 3 as, e.g., is shown in U.S. Pat. No. 3,483,814, and remove the defective component 44 by grasping its exposed cap 48 which extends beyond the end wall 28. Replacement of the heating element component 44 is accomplished by merely reversing the steps previously mentioned, i.e., by inserting either end of the component through respective pairs of opposed, aligned openings 41–43 in the end walls 28 preferably until the inserted contact rivet 47 is received within socket means 49 of the panel 4. The right end panel component 3 is then latched into position with the exposed, extending ends of the component 44 received within respective socket means 49 of the panel 3. Because the socket means 49 of the panel 3 are rigidly supported, the components 44 once received therein are forced into contact at their other ends with the socket means and contact rivets 49, 50 in the left panel 4. The free distance between opposed, aligned pairs of contact rivets 50 when both end panels 3, 4 are in position without the heating element components therein is intended to be less than the overall length of the components 44. Thus, upon insertion of the heating element components and latching of the end panel 3, the supports 51 of the socket means in the left end panel 4 are flexed to urge the contact rivets 47, 50 of the components 44 and socket means 49 into firm engagement.

Figure 6:
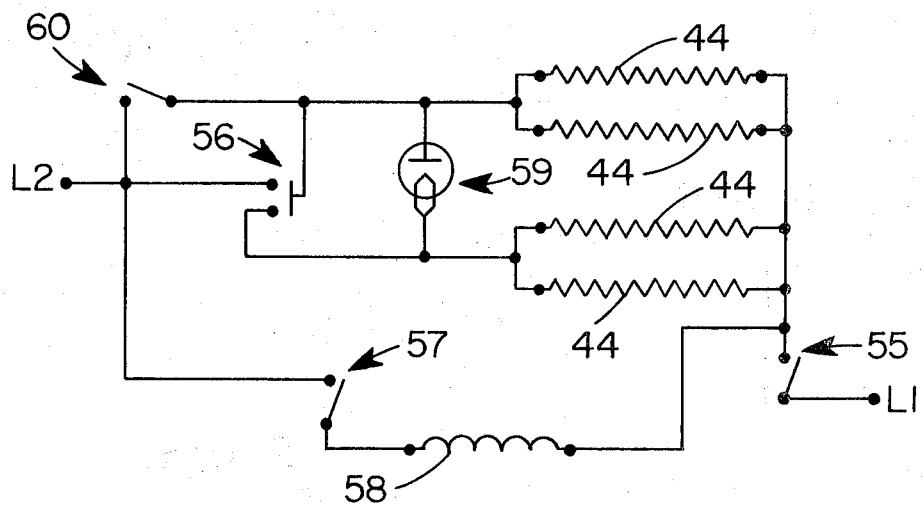
FIG. 6 is a schematic diagram showing the electrical circuitry of the present invention.

The supports 51 and 53 in combination with a conventional bussing system and other electrical elements, shown schematically in FIG. 6, not only assist in providing the ready release of the heating element components and firm engagement of abutting contact rivets, but also assist in effectuating operation of the toast and oven modes in the common heating chamber. The heating chamber is defined by the inner reflecting surfaces of the walls 7, 11, 12, 13, 14, 15, end walls 28, and bottom wall 32 (or a crumb tray, not shown, which may be supported by wall 32 in coextensive relationship therewith). Thus, with the reflecting surfaces substantially as defined and the carriage means 22 and heating element components located substantially as shown, the desired proportion of direct heat and reflected heat is received by food toasted in the vertical toast position. However, the same proportion is not necessarily desirable for the horizontal oven position because of the different relationship of food surfaces to reflecting surfaces and heating element surfaces which exists and which may result in an uneven heat distribution. It has been found that an effective solution to the heat distribution problem is to utilize the full wattage of each of the components in the vertical toast position but only the full wattage of the upper pair and one-half the wattage of the lower pair (within the openings 42 and 43) of components 44 in the horizontal oven position.

Referring now to FIG. 6, a schematic diagram of the electrical circuitry is shown. The circuit comprises a power supply L1 governed by the on-off line switch 55 actuated by either placing the food carriage in vertical toast position or placing the control 6 in oven "on" position. In accordance with the teachings of U.S. Pat. No. 3,483,814, it is preferred that the power supply be connected to the terminal elements of the toaster-oven so that it becomes a necessity to disconnect the toaster-oven from the power supply before the right end panel component 3 may be removed.

The pairs of upper and lower components 44 are maintained in parallel relationship with secondary switch means generally designated at 56 cutting in or out of the circuit a thermostat 60 and diode 50 shunt to the output line voltage, L2. Switch means 56 is biased closed to provide full wattage in the toasting mode and to override the possible opening of thermostat 60 and is actuated from bias closed position to open position when the carriage support 22 rises to its uppermost position. The toasting mode is terminated by the thermostat release switch generally designated at 57 which is closed only when pusher 23 biases contact 24 into closed position under bimetallic response to toasting temperature. The closing of switch 57 energizes the coil 58 to unlatch the bread carriage from hold position in the toasting mode as is more fully described in U.S. Pat. No. 2,952,432.

When the oven mode is desired, control 6 is moved to oven on position which closes the line switch 55. Switch 56 is open by virtue of the carriage 22 being in its uppermost position. Thus, the diode, of conventional design and generally designated at 59, (or a number of parallel diodes depending on the desired current characteristic) becomes effective within the circuit during the oven mode of operation and reduces the power across the lower pair of components 44 by one-half to thereby give rise to the proper proportion of direct heat and reflected heat on the exposed surfaces of the food supported by the grill on supports 31. Initially, the oven thermostat switch means generally designated at 60 is closed but intermittently it opens when the desired temperature in the heating chamber is reached to control same.

Thus, a relative positioning of the heating element components, carriage means and reflecting surfaces has been shown which efficiently accommodates toasting in a vertical position or cooking in a horizontal position without the necessity of relatively moving the heating element components or reflecting surfaces. This relationship is most effective when it is utilized in conjunction with a modulation in the power input to the lower pair of heating element components in the oven mode. In addition, a unique toasting thermostat venting feature and removable heating element components have been shown. It should be noted that failure of a food heating appliance often occurs at its heating elements and, therefore, an appliance which may be readily serviced to replace these elements without the need of repair shop service (by merely disconnecting the power supply cord, removing the right end panel and then replacing the heating element component which has failed) is a real benefit to the user.

As an example of the relative positioning of the heating element components with respect to the reflecting surfaces of the heating chamber and the food carriage means, it should be noted, as seen in FIG. 2, that the bottom pair of elements 44 are positioned below the horizontal food carriage means and support surface 31 and adjacent the bottom wall 32 whereas the upper elements 44 are both located in the upper half of the heating chamber with the front element (received in aligned openings 40) more proximate to the center line of the height dimension of the heating chamber. This positioning of the component 44 received in aligned openings 40 compensates for the angular relationship of the reflecting surfaces 12–15 with respect to the vertical. In addition, the vertical food carriage means in toasting position is located more proximate to the front of the toaster-oven than the rear.

Since the preferred embodiment may be modified in numerous ways within the scope of the present invention as, e.g., by changing materials which may alter relfectivity of heat, by changing the ratings of the heating element components or making the upper pair and/or lower pair a continuous single element component, et cetera, the preferred embodiment should be viewed as illustrative and not in a limiting sense.

What we claim is:

1. A toaster-oven comprising a heating chamber having vertically movable food carriage means and horizontally movable food carriage means and including a plurality of components including a chassis component, and at least one heating elelement component, a first end panel component positioned at one end of said chassis component, a second end panel component positioned at the other end of said chassis component in opposition to said first end panel component, said first end panel component comprising first electrical circuit means having first socket means with first electrical contact means therein, said second end panel component comprising second electrical circuit means having second socket means with second electrical contact means therein in opposition to said first socket means and contact means, at least one of said first and second end panel components being readily releasably secured to said chassis component, and said at least one heating element component being readily releasably supported in firm electrical contact means within said first and second socket means and being readily removable from said toaster-oven upon removal of said one of said first and second end panel components.

2. The toaster-oven set forth in claim 1 wherein at least one of said first and second socket means is flexibly supported, and said at least one heating element is of a length greater than the unbiased distance between opposed ones of said first and second contact means.

3. The toaster-oven set forth in claim 2 wherein said at least one heating element component comprises a cylindrical glass tube having electrical contacts at its ends and an axially extending resistance wire therein fixedly secured to said electrical contact.

4. The toaster-oven set forth in claim 1 wherein said at least one heating element component comprises a cylindrical glass tube having electrical contacts at its ends and an axially extending resistance wire therein fixedly secured to said electrical contact.

5. A toaster-oven comprising a heating chamber having vertically movable food carriage means and horizontally movable food carriage means and including a plurality of readily releasable components including a chassis component, an end panel component, and at least one heating element component, said chassis component including first electrical circuit means having first socket means with first electrical contact means therein and said end panel component including second electrical circuit means having second socket means with second electrical contact means therein in opposition to said first socket means and contact means, said end panel component being releasably secured to said chassis component and said at least one heating element component being releasably supported in firm electrical contact with said first and second electrical contacts of said first and second socket means in operation.

6. The toaster-oven set forth in claim 5 wherein said chassis component comprises a body portion and an end panel fixedly secured to said body portion in opposition to said end panel component, and said end panel includes said first electrical circuit means.

7. A toaster-oven having vertically movable food carriage means and horizontally movable food carriage means and further comprising a housing forming an enclosed chamber common to both of said food carriage means and said housing including a pair of opposed end walls, each of said end walls provided with at least one opening therethrough aligned with an opposed opening in the other of said end walls, an outside end panel disposed and spaced from each said end walls to cover said end walls and at least one of said panels being readily releasable therefrom, electrical heater element support means carried by said end panels in alignment with said openings, a heater element for heating said chamber, said heater element extends through said openings and is supported by said end panels such that they can be readily removed and inserted upon the removal of said one end panel, said openings in said end walls supporting said heating element intermediate said end panels to provide support when said panel is removed.

8. The toaster-oven according to claim 7 wherein said heater element support means include electrical contacts.

9. The toaster-oven according to claim 8 wherein said heater element support means are sockets for releasably holding heater elements.

10. The toaster-oven according to claim 9 wherein at least one of said sockets is yielding carried by at least one of said end panel.

11. The toaster-oven according to claim 10 further including a cylindrical heater element disposed and carried by said sockets and comprising an axial resistance wire terminating at its ends in electrical contacts and having resilient finger elements at the ends thereof for releasably engaging said sockets.

* * * * *